United States Patent [19]

Li

[11] Patent Number: 4,586,939

[45] Date of Patent: May 6, 1986

[54] PROCESS FOR SEPARATING GASEOUS MIXTURES USING A SEMIPERMEABLE MEMBRANE CONSTRUCTED FROM SUBSTITUTED POLY(ARYLENE OXIDE) POLYMER

[75] Inventor: George S. Li, Macedonia, Ohio

[73] Assignee: The Standard Oil Company, Cleveland, Ohio

[21] Appl. No.: 556,181

[22] Filed: Nov. 29, 1983

Related U.S. Application Data

[63] Continuation-in-part of Ser. No. 411,924, Aug. 26, 1982, abandoned, which is a continuation-in-part of Ser. No. 388,847, Jun. 16, 1982, abandoned.

[51] Int. Cl.$^4$ .............................................. B01D 53/22
[52] U.S. Cl. ........................................ 55/16; 55/158; 585/818
[58] Field of Search ................. 210/654, 490, 500.2, 210/506; 55/16, 158; 429/249, 253; 521/27; 204/296; 585/818, 819

[56] References Cited

U.S. PATENT DOCUMENTS

| | | | |
|---|---|---|---|
| 3,306,875 | 2/1967 | Hay | 260/47 |
| 3,350,844 | 11/1967 | Robb | 55/16 |
| 3,830,733 | 8/1974 | Spivack | 55/16 |
| 3,899,309 | 8/1975 | Hoehn et al. | 29/16 |
| 4,230,463 | 10/1980 | Henis et al. | 55/16 |
| 4,353,802 | 10/1982 | Hara | 210/654 |

OTHER PUBLICATIONS

White and Orlando, "Brominated Poly(Phenylene Oxides) II Bromination of Poly(2,6–Dimethyl-1,4–Phenylene Oxide)", Polyethers, 12, 178 (1974).

*Primary Examiner*—Ernest G. Therkorn
*Attorney, Agent, or Firm*—Gary R. Plotecher; Larry W. Evans

[57] ABSTRACT

The process for the separation of gases from a mixture is improved by using as the separation vehicle a single layer semipermeable membrane containing at least about 25 weight percent, based upon the total weight of the membrane, of at least one substituted poly(arylene oxide) polymer containing at least about 50 mole percent of structural units of the formula

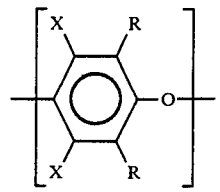

I wherein each R is independently a $C_1$ to $C_8$ aliphatic; a $C_5$ to $C_7$ cycloaliphatic; a $C_1$ to $C_8$ alkoxy radical; a $C_6$ to $C_{12}$ aromatic radical or an inertly-substituted derivative of any one of them, each radical being free of a tertiary alpha-carbon atom, each X is independently hydrogen or a radical at least the size of a chloride radical, with the proviso that at least one X is not hydrogen. The process can also be practiced with a semipermeable membrane containing at least about 50 weight percent, based upon the total weight of the membrane, of at least one substituted poly(arylene oxide) copolymer containing from about 80 to 95 mole percent of structural units of the formula

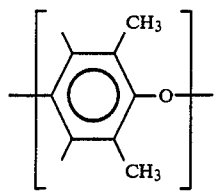

III and from about 5 to 20 mole percent of structural units of the formula

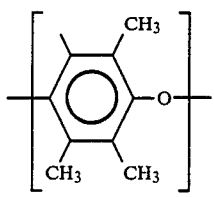

IV

28 Claims, No Drawings

PROCESS FOR SEPARATING GASEOUS MIXTURES USING A SEMIPERMEABLE MEMBRANE CONSTRUCTED FROM SUBSTITUTED POLY(ARYLENE OXIDE) POLYMER

CROSS-REFERENCE TO RELATED APPLICATION

This is a continuation-in-part of application U.S. Ser. No. 411,924 filed Aug. 26, 1982, which is, in turn, a continuation-in-part of application U.S. Ser. No. 388,847, filed June 16, 1982, both now abandoned.

TECHNICAL FIELD

Separation of gases by semipermeable membranes is fairly well known and constitutes a time and energy saving method over older technologies wherein gases are separated by liquefaction or chemical absorption or reaction techniques. Improved semipermeable membranes having greater life and lower cost have been continually sought.

The present invention relates to an improved process for the separation of gases employing a semipermeable membrane constructed from substituted poly(arylene oxide) polymers. The membrane can be fabricated into hollow fibers, as is known in the art, and arranged in bundles carried in larger diameter tubes for countercurrent separation of large volumes of gas mixtures on a continuous basis.

BACKGROUND ART

The use of a semipermeable membrane to effect the separat of a gaseous mixture into its various component parts, or at least enriched fractions of the same, has long been known. The development of semipermeable membranes for this purpose is well summarized in columns 4–6 of U.S. Pat. No. 4,230,463. This patent describes in detail multicomponent membranes and discloses a plurality of organic polymers for use as the porous separation membrane including polysulfone, copolymers of styrene and acrylonitrile, polycarbonate and cellulose acetate. Coating materials also include a variety of polymers such as polysiloxane, polyisoprene, alpha-methylstyrene and polysiloxane copolymers and polystyrene. The multicomponent membrane can be employed to separate selectively at least one gas such as hydrogen from a mixture containing two or more of the following gases: hydrogen, carbon monoxide, carbon dioxide, helium, nitrogen, oxygen, argon, hydrogen sulfide, nitrous oxide, ammonia and $C_1$ to $C_5$ hydrocarbons.

In addition to the foregoing membranes, others are known for this purpose including those described in U.S. Pat. Nos. 3,350,844 and 3,899,309. While most, if not all, of these membranes show effectiveness in their intended use, none are completely satisfactory. Generally, the membranes used for these separations lack either one or more of desirable flux, selectivity and life and thus industry continues to search for alternatives.

Of particular interest to the chemical processing industry are membranes showing good characteristics for separating carbon dioxide and/or hydrogen sulfide from hydrocarbon streams, typically natural gas, and oxygen enrichment from air. Commercially, these processes do not employ membranes but rather absorption techniques in the former and cryogenic techniques in the latter. Both of these techniques are energy intensive and consequently expensive to operate. Accordingly, there exists the need for identifying and implementing alternative processes and those employing membrane technology appear at this time to offer significant economic advantages. However, to date no membrane has been identified as completely suitable for either one of these processes.

DISCLOSURE OF THE INVENTION

According to this invention, a process for the separation of gases from a mixture containing at least two gases into two fractions, one fraction being enriched with at least one of the gases and the other fraction being depleted in same, comprises the step of contacting the gaseous mixture with a single layer semipermeable membrane in such a manner that a portion of the gaseous mixture selectively passes through the membrane resulting in the enriched fraction being on one side of the membrane and the depleted fraction being on the other side of the membrane, the improvement comprising the use of a semipermeable membrane containing at least about 25 weight percent, based upon the total weight of the membrane, of at least one substituted poly(arylene oxide) polymer containing at least about 50 mole percent of structural units of the formula

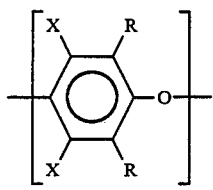

I wherein each R is independently a $C_1$ to $C_8$ aliphatic radical; a $C_5$ to $C_7$ cycloaliphatic radical; a $C_1$ to $C_8$ alkoxy radical; a $C_6$ to $C_{12}$ aromatic radical or an inertly-substituted derivative of any one of them, each radical being free of a tertiary alpha-carbon atom; and each X is independently hydrogen or a radical at least the size of a chloride radical, with the proviso that at least one X is not hydrogen.

The process can also be conducted over a semipermeable membrane containing at least about 50 weight percent, based upon the total weight of the membrane, of at least one substituted poly(arylene oxide) copolymer containing from about 80 to 95 mole percent of structural units of the formula

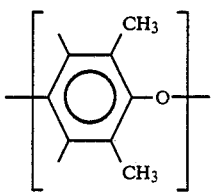

III and from about 5 to 20 mole percent of structural units of the formula

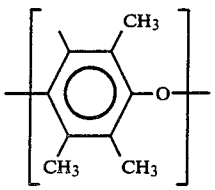

This process operates in substantially the same manner as known processes, i.e., the gaseous mixture is contacted with the semipermeable membrane in such a manner that a portion of the gaseous mixture selectively passes through the membrane resulting in the enriched fraction being on one side of the membrane while the depleted fraction remains on the other side of the membrane. This process is particularly useful for separating carbon dioxide and hydrogen sulfide from natural gas streams, as they are constituted at the wellhead, and for producing an enriched oxygen stream from air. The process of this invention is characterized by excellent flux and selectivity, particularly in relation to separating carbon dioxide from methane and oxygen from nitrogen.

PREFERRED MODE FOR CARRYING OUT THE INVENTION

The process of this invention is suitable for separating any one of a number of different gases such as hydrogen, helium, nitrogen, oxygen, carbon monoxide, carbon dioxide, hydrogen sulfide, ammonia, water (vapor) and $C_1$ to $C_4$ hydrocarbons from mixtures containing the same. Typical gas mixtures where separation is desirable include $H_2/N_2$; $H_2/CO$; $H_2/C_1$ to $C_4$; $H_2/O_2$; $H_2/NH_3$; $CO_2/C_1$ to $C_4$; $CO_2/N_2$; $H_2S/C_1$ to $C_4$; $O_2/N_2$; $N_2/NH_3$; $He/C_1$ to $C_4$; $H_2S/C_1$ to $C_4$ and $H_2O/C_1$ to $C_4$. Generally methane is the preferred hydrocarbon. The membrane can also be employed for the separation of mixtures comprising three gases or more. It is to be understood that not all gas pairs or mixtures will be separated optimally over a given membrane of the present invention. So long as the membrane exhibits a selectivity for at least one gas in a mixture, it has utility for that particular mixture.

This invention is particularly useful for separating carbon dioxide and/or hydrogen sulfide from natural gas and oxygen from air. The relative amount of the gases comprising the gaseous mixture can vary widely and thus this invention finds applicability in a wide variety of separation activities.

The membrane employed in the process of the present invention contains at least about 25 weight percent of at least one substituted poly(arylene oxide) polymer containing structural units of the formula

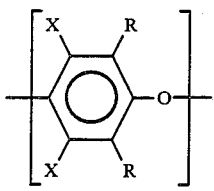

wherein R and X are as previously defined. Each R is independently a $C_1$ to $C_8$ aliphatic radical with alkyl being preferred; a $C_1$ to $C_8$ alkoxy with methoxy being preferred; a $C_5$ to $C_7$ cycloaliphatic with cycloalkyl being preferred; an aryl radical, preferably phenyl or an inertly-substituted derivative of any one of these. As here used, the term "inertly-substituted" means the radical can contain one or more substituents, such as halogen, alkyl, nitro, alkoxy, and the like, that do not substantially reduce the selectivity characteristics, for its intended use, of the membrane into which the polymer is constructed. Typical R radicals are free of tertiary alpha-carbon atoms and include methyl, ethyl, n-propyl, isopropyl, butyl, methoxy, ethoxy, cyclohexyl, phenyl, tolyl, bromomethyl and the like. As here used, the term "independently" means that each substituent can be the same or different on any given structural unit, e.g., each R can be methyl or one can be methyl while the other ethyl.

The X radicals of formula I that are not hydrogen serve, at least in part, as steric inhibitors and are thus bulky and/or polar in nature. By "steric inhibitors" is meant that these radicals tend to act as spacers between adjacent polymer chains. Although these radicals may also serve other functions as well, such as enhancing the overall polarity of the membrane, the total gamut of their function is not fully understood at this time. These radicals are preferably at least the size of a chloride radical. Representative of these radicals are such groups as halide (chloride, bromide or iodide); azide; hydroxyl; thiol; ether; thioether; ester, thioester; a phosphoric acid, ester or salt; nitro; nitrate, nitrite; alkyl; aryl; acyl; thioacyl; etc. Preferred among these radicals are the halide radicals, particularly the bromide radical and alkyl radicals, particularly methyl.

The substituted poly(arylene oxide) polymers here used can be either homopolymers or copolymers with other substituted poly(arylene oxide) polymers, viz, poly(phenylene oxide) (PPO), where both X's are hydrogen. Preferably, the substituted poly(arylene oxide) polymers here used consist essentially of structural units of formula I although not each structural unit may contain the same substituents e.g., the same R or X radicals. Ring-brominated poly(2,6-dimethyl-p-phenylene oxide)

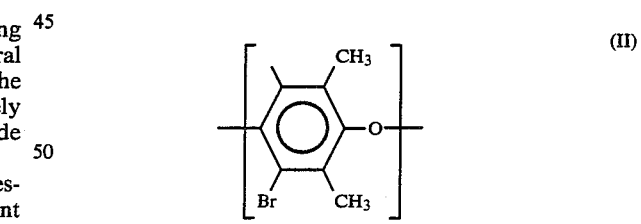

also known as ring-brominated poly(2,6-dimethyl-1,4-phenylene oxide) and ring-brominated poly(xylylene oxide) or poly(2,6-xylenol), is an especially preferred substituted polyarylene polymer. As noted hereinabove, where X is bromine, at least 50 percent of the rings should contain one bromine atom for an overall average of one-half bromine atom on each ring and a maximum of two bromines per ring, where both X's are bromine. Generally, higher bromine content is favored and in the instance where the membrane is formed by a copolymer comprising structural units of formula I with other comonomers, one bromine atom per ring, as in formula II, is desirable as the comonomer will dilute the overall bromine content.

Another membrane that can be employed in the process of the present invention is a copolymer of 2,6-dimethylphenol which has the formula

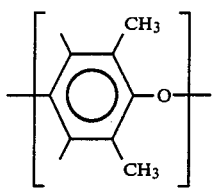

and of 2,3,6-trimethylphenol which has the formula

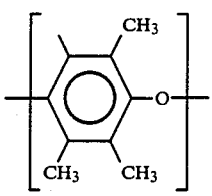

The copolymer is represented by the formula

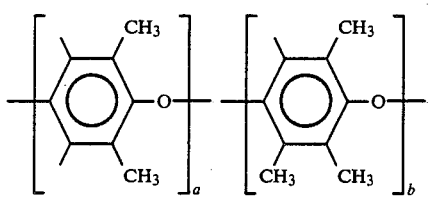

where a is from about 80 to 95 and b is from about 5 to 20. For practice of the present invention with membranes comprising the copolymer of formula V, no more than 20 percent of the rings should contain the third methyl radical (X is methyl, formula IV). Generally, lower amounts of this unit, e.g., 5 to 20 mole percent, are preferred unlike the instance where X is bromine discussed hereinabove. While the membrane can comprise as little as 50 mole percent of the copolymer of formula V with other comonomers, membranes formed from the copolymer of formula V preferably comprise 100 mole percent thereof.

Thus, for membranes formed by a copolymer, where X is a halogen, particularly bromine, the mole percent of structural units of formula I should be at least about 50 and preferably at least about 75. However, in the special instance where the membrane comprises the copolymer of formula V, the mole percent of structural units of formula I should be only from about 5 to 20 and the copolymer should be formed with about 80 to 95 mole percent of PPO. Copolymers with the copolymer of formula V can comprise at least about 50 and preferably 100 weight percent of formula V with other copolymerizable or polymeric structural units. Where the polymer membrane comprises the structural units of formula I, particularly formula II, the minimal amount is lower, at least about 25 weight percent. Other available copolymerizable or polymeric structural units will be discussed hereinbelow.

Regarding the molecular weight of the foregoing substituted poly(arylene oxide) polymers, weight average molecular weight will be from about 10,000 to almost any practical upper weight, with a preferred range of about 30,000 to about 300,000. Commercially available, unsubstituted polyphenyleneoxides range between 40,000 to 50,000. Practical considerations, such as economy, ease of membrane fabrication and the like are the only significant limitations on the molecular weight of these substituted poly(arylene oxide) polymers and optimum molecular weight will usually be determined by the particular gas mixture to be separated.

The substituted poly(arylene oxide) polymers here used are generically known materials and thus the preparation of many of them is known in the art. For example, ring-brominated poly(2,6-dimethyl-p-phenylene oxide) can be readily prepared by first polymerizing 2,6-xylenol as taught by A. S. Hay in the *Journal of Polymer Science*, 58, 581 (1962) entitled "Polymerization by Oxidative Coupling" and subsequently brominating the polymer under ionic conditions as taught by White and Orlando in *Polyethers*, 12, 178 (1974) entitled "Brominated Poly(Phenylene Oxide)s. II Bromination of Poly(2,6-dimethyl-1,4-Phenylene Oxide)." By analogous steps, many of the other substituted polyarlene oxide polymers here described can be prepared As stated hereinabove, the semipermeable membranes used in this invention are constructed from at least one of the substituted poly(arylene oxide) polymers containing structural units of formula I. Any polymer that is compatible with the substituted poly(arylene oxide) polymer(s) can also be used in the construction of the membrane and typical polymers include poly(aryl sulfone), poly(phenylene oxide), poly(maleic anhydride) and its various copolymers, etc. While the molecular weight of these other polymers can vary widely, they are usually within a fifty percent range of the molecular weight of the substituted poly(arylene oxide) polymer. Although some blending of polymers may be desirable to impart certain physical characteristics to the membrane, such as strength, durability and flexibility, generally the incorporation of other polymers into the membrane is preferably kept to a minimum to avoid diluting the flux and selectivity characteristics imparted to it by the substituted poly(arylene oxide) polymer Accordingly, the substituted poly(arylene oxide) polymer and copolymers described herein constitute at least about 25, preferably at least about 50 and more preferably at least about 75, weight percent of the membrane depending upon the actual composition of the membrane.

These membranes are fabricated by the conventional methods used to fabricate other membranes and in one embodiment, the polymer is dissolved in a suitable solvent to form about a 1 to 20, preferably 5 to 10 weight percent solution. Generally, any nonpolar solvent can be employed with chloroform, toluene, chlorobenzenes e.g., o-dichlorobenzene and the chlorinated hydrocarbons e.g., perchloroethylene being exemplary. These nonpolar solvents can be used in combination with polar solvents, such as dimethylformamide, dimethyl sulfoxide, dimethyl acetamide, acetone and methylethyl ketone but in such combinations, the nonpolar solvent(s) constitutes at least about 50 weight percent of the mixture. If a crosslinker and/or another polymer is used in the manufacture, then a 1 to 20, preferably 5 to 10, weight percent solution of these materials is prepared, generally in the same solvent used to prepare the substituted poly(arylene oxide) polymer solution, and then the two or more solutions are mixed at room temperature. The resulting mixture can then be poured over a clean glass plate and spread evenly to a uniform thickness with the aid of some instrument, e.g., a doctor blade. The membrane is then air dried, removed from the glass plate and further dried in air under ambient conditions for a suitable period of time, generally in excess of 24 hours Crosslinking, if any, and solvent evaporation (removal) occur concurrently throughout the drying step. In other embodiments, these membranes can be manufactured by the various laboratory and commercial techniques known in the art. These membranes can also be manufactured into structure other than films, such as hollow fibers. Moreover, these membranes or films can be used in composite formulations, such as a coating on a substrate, laminates and the like.

The membranes used in this invention can be fabricated at any desired thickness although membranes having a thickness less than about 25 mils (1 mil equals 25 microns), preferably less than about 10 mils, tend to be the most useful. Inasmuch as the flux of a membrane tends to increase with a decrease in the thickness of the membrane, generally the thinner the membrane, the more desirable the membrane. Of course, the ultimate thickness of the membrane is determined by a host of factors of which flux is just one and thus the preferred membrane thickness will vary from application to application.

The semipermeable membranes of this invention are used in the same manner as conventional membranes, i.e., the gaseous mixture is contacted with one side of the membrane, typically under pressure, and one or more gaseous constituents of the mixture are selectively passed through the membrane while the remaining gaseous constituents are rejected by the membrane This results in an enriched fraction of the desired gas forming on one side of the membrane while a depleted fraction of the same gas is formed on the other side of the membrane. Generally, the desired gas is passed through the membrane, i.e., in separating carbon dioxide from the other gaseous constituents of natural gas, carbon dioxide passes through the membrane while the majority of the other gaseous constituents are rejected. However, certain gases will generally not be rejected by these membranes and these are generally molecules of small size, such as hydrogen and helium. Likewise, in the separation of oxygen from the other gaseous components of air, oxygen permeates through the membrane while nitrogen and various other gaseous components are selectively rejected.

Operating temperatures employed during the practice of this invention can vary widely and are generally those used under similar separation processes. Any temperature at which the membrane is both physically and chemically stable can be used while the pressure will vary with, among other parameters, the physical strength of the membrane.

The following examples are illustrative of specific embodiments of this invention and unless indicated to the contrary, all parts and percentages are by weight.

The membranes reported hereinbelow were prepared from the substituted poly(arylene oxide) polymers prepared by the descriptions which follow. The actual membrane was prepared by mixing a dilute, about 7 to 8 weight percent, solution of polymer, copolymer or blend in a suitable solvent, typically chloroform, poured over a clean glass plate and spread evenly to a uniform thickness with the aid of a doctor blade, air dried, removed from the glass plate, and further dried in air at ambient conditions for at least 24 hours.

A modified Gilbert cell was used to test the permeation of the films. The test side was exposed to a carbon dioxide/methane/nitrogen mixture in a mole ratio of 2.99:32:65 or oxygen/nitrogen in a mole ratio of 21.3:78.7. The permeant was picked up by a carrier gas, helium, and injected intermittently through a sample valve into a GC column for analysis. The experiments were conducted at 23° C., the partial pressure of the test gas on the feed side was 0.21 MPa and the partial pressure of the product gas on the permeant side was about 0, and purged with 0.21 MPa helium at a flowrate much in excess of the permeation rate. The area of the test membrane was about 45.8 square cm. The film thickness was between 1-2 mils.

In the examples reported hereinbelow, the separation of $CO_2/CH_4$ or $O_{22}$ have been selected to demonstrate the use of the process of the present invention. Membranes comprising unmodified PPO as well as brominated PPO were prepared and compared with various substituted species and copolymers of the invention.

Selectivity, as is known, is a comparison of the permeability, $\overline{P}$, of one gas divided by the permeability of the second gas in the mixture. Normally, the less permeable member of the gas pair is placed in the denominator and the selectivity factor will be a number greater than one. Permeability, in turn, is customarily calculated according to the relationship $$\overline{P} = \frac{(cc)(cm)}{(sec)(cm^2)(cmHg)}$$

where cc is the volume of the permeating gas at standard temperature and pressure, cm is the thickness of the membrane, sec is the time in seconds for a given amount of gas to be permeated, $cm^2$ is the area of the membrane and cmHg is the pressure differential over the membrane in cm of mercury. Permeability as such as reported in Barrers, one Barrer being equal to $1 \times 10^{-10} \overline{P}$. Gas pressures on the membranes of this invention can range from about 0.10 to 200 MPa with five to 100 MPa being preferred.

The polymers employed herein to manufacture the membranes were all based upon poly(2,6-dimethyl-p-phenylene oxide) (subsequently "polymer") having a weight average molecular weight of about 40,000 (sold by Aldrich Chemical Company).

A typical preparation of a ring-brominated polymer commenced with contacting the polymer (60 g) dissolved in chloroform (600 g) at room temperature with bromine (94 g) in a glass reactor. Contacting or addition time was approximately 45 minutes. The reaction mixture was then further stirred at room temperature for an additional hour. The final mixture was poured into stirred methanol to precipitate the polymer, the product polymer was further washed with methanol and dried under vacuum to give 97 g of product. Elemental analysis showed the bromide content of the polymer to be about 40 weight percent and proton NMR spectroscopy showed that the bromide radical was attached to the aromatic ring portion of the polymer.

The polymer was also used to prepare a control polymer, i.e., benzylic-brominated poly(2,6-dimethyl-p-phenylene oxide). This preparation commenced by contacting the polymer (70 g) dissolved in 1500 g of carbon tetrachloride with N-bromosuccinimide (220 g) and benzoyl peroxide (3 g). The reaction mixture was then heated with stirring to 76° C. for approximately 6 hours under a nitrogen atmosphere. Isolation and purification of the product polymer were identical to those used for preparing the ring-brominated material and a yield of 102 g of product polymer was recovered. Elemental analysis showed that the bromide content of the product polymer to be approximately 36 weight percent and the proton NMR spectrum showed the bromination occurred primarily on the benzylic (methyl) position of the polymer.

The carbon dioxide permeability and carbon dioxide/methane selectivity figures are reported in Table I. The polymer(s) from which the membrane was constructed are presented in the column captioned "Polymer" and the bromide content of each of these polymers is given in the parentheses following its identification. RB-PPO means ring-brominated poly(2,6)-dimethyl-p-phenylene oxide), PPO means poly(2,6-dimethyl-p-phenylene oxide), BB-PPO means benzylic-brominated poly(2,6-dimethyl-p-phenylene oxide), and PAS means poly(aryl sulfone).

TABLE I

Separation Characteristics of Semipermeable Membranes Prepared From Various Substituted PPO Polymers

| Exp. No. | Polymer | $\overline{P}\,CO_2$ | Selectivity |
|---|---|---|---|
| 1 | RB-PPO (40%) | 180 | 22 |
| 2 | 2:1 Blend[2] RB-PPO (40%):PAS(7%)[1] | 30 | 31 |
| 3 | 1:1 Blend[2] RB-PPO (40%):PPO(20% overall) | 154 | 20 |
| 4 | RB-PPO (32%) | 149 | 20 |
| 5 | PPO | 87 | 18 |
| 6 | BB-PPO (36%) | 22 | 15.3 |

[1] Poly(aryl sulfone) (weight average molecular weight 30,000, containing about 7% sulfur, sold by Aldrich Chemical Company).
[2] By weight.

The data of Table I clearly demonstrates the general superiority of membranes formed from ring-brominated poly(2,6-dimethyl-p-phenylene oxide) polymers, Examples 1 to 4, over membranes formed from similar polymers but without an X group, Control Examples 5 and 6. The separation factor was much greater with a ring-brominated polymer than for either the benzylic-brominated or unbrominated polymers as was the carbon dioxide permeation factor.

The above procedure for determining carbon dioxide permeability and carbon dioxide/methane selectivity was repeated except a mixture of oxygen and nitrogen at a mole ratio of 21.3:78.7 was used. The results of this testing are reported in Table II.

TABLE II

Separation Characteristics of Semipermeable Membranes Prepared From Various Substituted PPO Polymers

| Exp. No. | Polymer | $\overline{P}\,O_2$ | Selectivity |
|---|---|---|---|
| 7 | RB-PPO (40%) | 23 | 3.86 |
| 8 | BB-PPO (36%) | 3.2 | 4.0 |
| 9 | PPO | 13.1 | 4.3 |

The data of Table II again shows the superiority of a ring-brominated poly(2,6-dimethyl-p-phenylene oxide) polymer over its benzylic brominated and unbrominated counterparts.

For the last series of tests, a membrane was formed from the copolymer of 2,6-dimethylphenol (PPO) and 2,3,6-trimethylphenol. The copolymer itself was prepared according to the following procedure. Into a 500 ml three neck flask fitted with an oxygen inlet and cooling condenser was charged 2 g of $Cu_2Br_2$, 10 g of $MgSo_4$, 20 g of diethylamine and 150 g benzene. Oxygen was bubbled vigorously through this mixture for ten minutes after which a mixture comprising 19 g of 2,6-dimethylphenol and 1 g of 2,3,6-trimethylphenol, dissolved in 50 g of benzene was added. Oxygen was again bubbled through the mixture for four hours at which time the reaction was complete. Temperature during this time rose to a maximum of 36° C. A viscous product was diluted with 100 g of toluene and 20 g of acidic acid and then filtered through a sintered glass funnel. The filtrate was precipitated in isopropanol, again filtered, dried in a vacuum oven and colletected. Yield of copolymer was 16.4 g or 85% conversion. The membrane was formed by dissolving 3 g of the copolymer in 40 g of chloroform and cast over glass as described hereinabove. The film was then oven dried and tested.

The copolymer of formula III was utilized as a membrane for the separation of a $CO_2/CH_4$ mixture. For comparison, a membrane was also prepared from a homopolymer containing 100 parts of PPO in lieu of 95 parts PPO and 5 parts of 2,3,6-trimethylphenol. $\overline{P}CO_2$ for the copolymer of formula V was 58±8 percent greater than where PPO was employed, clearly demonstrating the superiority of this membrane employed in the process of the present invention.

Based upon the results appearing in Tables I and II and otherwise discussed hereinabove, it can be seen that the process of the present invention is an improvement over processes utilizing other semipermeable membranes for the separation of gaseous mixtures. The poly(arylene oxide) polymer must be modified with at least one radical the size of a chloride radical.

It is to be understood that the semipermeable membranes of the present invention can comprise other components than the brominated PPO and PPO copolymers of formulas II and V, respectively exemplified herein, the examples having been provided merely to demonstrate practice of the subject invention. Those skilled in the art may readily select other modified poly(arylene oxides) according to the disclosure made hereinabove.

Lastly, although operability of the process to separate $CO_2$ from $CH_4$ and $O_2$ from $N_2$ has been demonstrated herein, the membrane of the present invention and process for separating gases therewith can be employed with other gas mixtures so long as the members of a given pair have different permeability rates from each other.

Thus, it is believed that any of the variables disclosed herein can readily be determined and controlled without departing from the spirit of the invention herein disclosed and described. Moreover, the scope of the invention shall include all modifications and variations that fall within the scope of the attached claims.

I claim:

1. In a process for the separation of gases from a mixture containing at least two gases into two fractions, one fraction being enriched with at least one of said gases and the other fraction being depleted in same, the process comprising:

contacting the gaseous mixture with a semipermeable membrane in such a manner that a portion of the gaseous mixture selectively passes through the membrane resulting in the enriched fraction being on one side of the membrane and the depleted fraction being on the other side of the membrane, the improvement comprising the use of a single layer semipermeable membrane containing at least about 25 weight percent, based upon the total weight of the membrane, of at least one substituted poly(arylene oxide) polymer containing at least about 50 mole percent of structural units of the formula

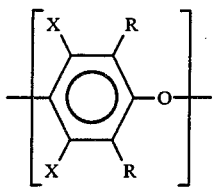

I wherein each R is independently a $C_1$ to $C_8$ aliphatic radical; a $C_5$ to $C_7$ cycloaliphatic radical; a $C_1$ to $C_8$ alkoxy radical; a $C_6$ to $C_{12}$ aromatic radical or an inertly-substituted derivative of any one of them, each radical being free of a tertiary alpha-carbon atom; and each X is independently hydrogen or a halide radical at least the size of a chloride radical, with the proviso that at least one X is not hydrogen.

2. The process of claim 1 wherein each R is independently a $C_1$ to $C_8$ alkyl radical.

3. The process of claim 2 wherein each R is a methyl radical.

4. The process of claim 3 wherein said halide is a bromide radical.

5. The process of claim 4 wherein the substitute poly(arylene oxide) polymer contains at least about 75 mole percent of the structural units of formula I.

6. The process of claim 5 wherein the gaseous mixture is natural gas.

7. The process of claim 5 wherein the gaseous mixture is air.

8. The process of claim 4 wherein the substituted poly(arylene oxide) polymer consists essentially of structural units of formula I.

9. The process of claim 8 wherein the membrane contains at least about 50 weight percent, based upon the total weight of the membrane, of at least one substituted poly(arylene oxide) polymer.

10. The process of claim 9 wherein the membrane contains at least one substituted poly(arylene oxide) polymer in combination with a compatible polymer.

11. The process of claim 10 wherein the compatible polymer is poly(aryl sulfone) or poly(2,6-dimethyl-p-phenylene oxide).

12. The process of claim 8 wherein the membrane contains at least about 75 weight percent, based upon the total weight of the membrane, of at least one substituted poly(arylene oxide) polymer.

13. The process of claim 12 wherein the membrane is a hollow fiber.

14. The process of claim 13 wherein the membrane has a thickness less than about 10 mils.

15. The process of claim 8 wherein the membrane contains essentially ring-brominated poly(2,6-dimethyl-p-phenylene oxide).

16. The process of claim 1 wherein the membrane is cast as a coating on a substrate.

17. The process of claim 15 wherein the coated substrate is a hollow fiber.

18. The process of claim 1 wherein the gases in said mixture are selected from the group consisting of hydrogen, helium, oxygen, nitrogen, carbon monoxide, carbon dioxide, hydrogen sulfide, ammonia, water vapor and $C_1$ to $C_4$ hydrocarbons.

19. In a process for the separation of gases from a mixture containing at least two gases into two fractions, one fraction being enriched with at least one of said gases and the other fraction being depleted in same, the process comprising:

contacting the gaseous mixture with a semipermeable membrane in such a manner that a portion of the gaseous mixture selectively passes through the membrane resulting in the enriched fraction being on one side of the membrane and the depleted fraction being on the other side of the membrane, the improvement comprising the use of a semipermeable membrane containing at least about 50 weight percent, based upon the total weight of the membrane, of at least one substituted poly(arylene oxide) copolymer containing from about 80 to 95 mole percent of structural units of the formula

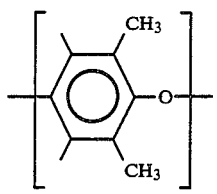

III and
from about 5 to 20 mole percent of structural units of the formula

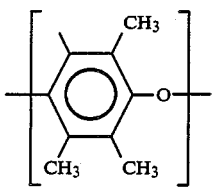

IV

20. The process of claim 19 wherein the substituted poly(arylene oxide) copolymer contains 95 mole percent of the structural units of formula III and 5 mole percent of the structural units of formula IV.

21. The process of claim 19 wherein the membrane contains 100 weight percent of the copolymer formed by structural units of formula III and formula IV.

22. The process of claim 21 wherein the gaseous mixture is air.

23. The process of claim 21 wherein the gaseous mixture is natural gas.

24. The process of claim 19 wherein the membrane is cast as a coating on a substrate.

25. The process of claim 24 wherein the coated substrate is a hollow fiber.

26. The process of claim 19 wherein the membrane is a hollow fiber.

27. The process of claim 26 wherein the membrane has a thickness less than about 10 mils.

28. The process of claim 19 wherein the gases in said mixture are selected from the group consisting of hydrogen, helium, oxygen, nitrogen, carbon monoxide, carbon dioxide, hydrogen sulfide, ammonia, water vapor and $C_1$ to $C_4$ hydrocarbons.

* * * * *